(12) United States Patent
Stedman et al.

(10) Patent No.: US 8,875,210 B2
(45) Date of Patent: *Oct. 28, 2014

(54) VIDEO CONFERENCE TOUCH BLUR

(75) Inventors: Roy Stedman, Austin, TX (US); Carlton Andrews, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/349,928

(22) Filed: Jan. 13, 2012

(65) Prior Publication Data

US 2013/0182061 A1 Jul. 18, 2013

(51) Int. Cl.
*H04N 7/14* (2006.01)

(52) U.S. Cl.
USPC ........... 725/116; 725/131; 725/139; 725/141; 725/146; 725/151

(58) Field of Classification Search
CPC ................... H04N 21/234363; H04N 21/4621
USPC ............... 348/565, 14.1; 725/25, 43, 132, 90
See application file for complete search history.

(56) References Cited

U.S. PATENT DOCUMENTS

| 6,675,387 | B1* | 1/2004 | Boucher et al. | 725/105 |
| 7,630,549 | B2* | 12/2009 | Aharon et al. | 382/173 |
| 8,074,241 | B2* | 12/2011 | Arfidsson et al. | 725/38 |
| 8,380,045 | B2* | 2/2013 | Berry et al. | 386/248 |
| 2002/0188772 | A1* | 12/2002 | Radcliffe et al. | 710/38 |
| 2003/0142872 | A1* | 7/2003 | Koyanagi | 382/236 |
| 2003/0235338 | A1* | 12/2003 | Dye | 382/232 |
| 2007/0035615 | A1* | 2/2007 | Kung | 348/14.08 |
| 2007/0056000 | A1* | 3/2007 | Pantalone et al. | 725/90 |

OTHER PUBLICATIONS

C. Andrews et al., U.S. Appl. No. 13/229,145, filed Sep. 9, 2011, entitled Video Transmission With Enhanced Area.

* cited by examiner

*Primary Examiner* — Mohammad Islam
(74) *Attorney, Agent, or Firm* — Terrile, Cannatti, Chambers & Holland, LLP; Stephen A. Terrile

(57) ABSTRACT

A system for providing video conference touch blur. More specifically, in certain embodiments, a video conference touch blur operation is performed by actuating (e.g., via touch or via a mouse operation) a video conference screen image to blur areas that are not to be transmitted in high definition.

12 Claims, 2 Drawing Sheets

VIDEO CONFERENCE TOUCH BLUR

BACKGROUND OF THE INVENTION

1. Field of the Invention

The present invention relates to information handling systems and more particularly to a system for providing video conference touch blur.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems to execute and administer video conferences. Increasingly with information handling system such as tablets, phones and PCs, video conferencing capabilities have increased to the point that it is easily possible to transmit more information than may be desired by the user. The rise of home-based workers and telecommuting has raised the need for privacy and security in video images. Often with video conferences users don't always want or need the entire videoconference of them or their surroundings transmitted in high definition.

SUMMARY OF THE INVENTION

In accordance with the present invention, a system for providing video conference touch blur is disclosed. More specifically, in certain embodiments, the video conference touch blur is performed by actuating (e.g., via touch or via a mouse operation) a video conference screen image to blur areas that are not to be transmitted in high definition. In certain embodiments, the system for providing video conference touch blur performs facial recognition on the video conference screen image to link blurred areas indexed to a face of a user. In certain embodiments specific objects may be identified and linked to blurred or non-blurred areas as the objects move within the video image area. In certain embodiments, the system further includes a blur all or no blur option if a face disappears from the video conference screen image.

Using a touch screen to perform a 'virtual smudge' operation on the video image is an intuitive and natural way to select areas of video that are not to be transmitted, or are to be transmitted only in degraded form. Additionally, by using facial-recognition, user-detection or object recognition software, the blurred areas can be moved, expanded and reduced as the user's head or designated object moves in the video frame.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
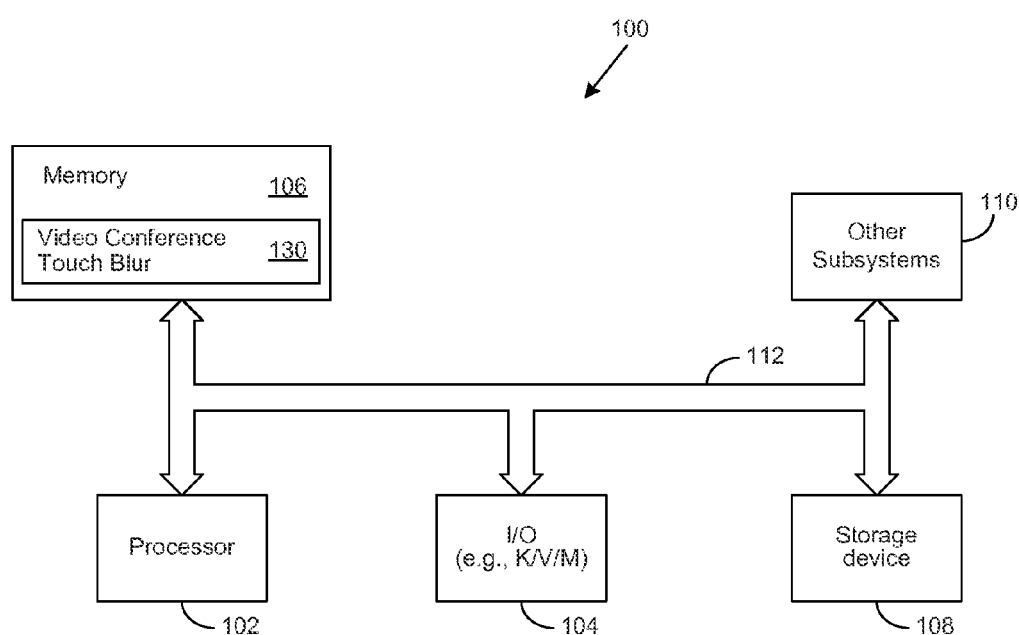
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers (each of which may be coupled remotely to the information handling system 100), a memory 106 including volatile memory such as random access memory (RAM) and non-volatile memory such as a hard disk and drive, and other storage devices 108, such as an optical disk and drive and other memory devices, and various other subsystems 110, all interconnected via one or more buses 112. The memory 106 also stores a video conference touch blur system 130.

With the video conference touch blur system 130 a video conference touch blur operation is performed by actuating (e.g., via touch or via a mouse operation) a video conference screen image to blur areas that are not to be transmitted in a higher resolution (e.g., high definition). Additionally in certain embodiments, the video conference touch blur system 130 performs facial recognition on the video conference screen image to link blurred areas indexed to a face of a user. Additionally in certain embodiments, the video conference touch blur system 130 performs object recognition on the video conference screen image to link blurred areas indexed to the designated and recognized object. Also in certain embodiments, the video conference touch blur system 130 further includes a blur all or no blur option that can be used for example if a face disappears from the video conference screen image.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
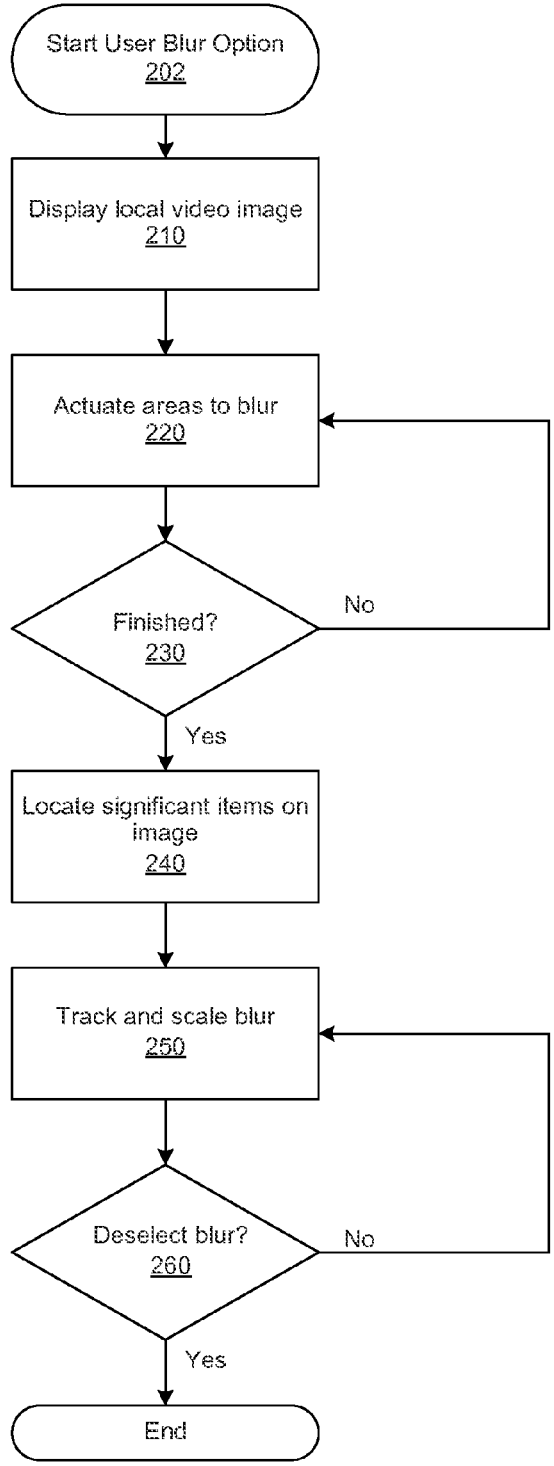
FIG. 2 shows a flow chart of the operation of a video conference touch blur system.

Referring to FIG. 2, a flow chart of the operation of a video conference touch blur system 130 is shown. More specifically, the operation starts when a user selects a blur option at step 202. This option may be started either for a video conference that is already in session or for an anticipated video conference. Next at step 210, the video conference touch blur system 130 displays a local version of the image that is to be transmitted via a video conference operation. Next, a user actuates (e.g., by touching or sliding over) an area to be blurred at step 220. The actuation may also be accomplished by controlling a cursor via a mouse or other I/O device. After an area to be blurred is identified via the actuation, the video conference touch blur system 130 determines whether the user has finished selecting areas to blur at step 230. If not, then the user actuates another area to blur at step 220. If so, then the video conference touch blur system 130 locates significant items within the image to be transmitted at step 240. The significant items can include a face (or if a plurality of users are participating in the video conference multiple faces). The video conference touch blur system 130 can include facial recognition portion for locating the significant items.

Next at step 250, the video conference touch blur system 130 tracks and scales the actual blurred areas to correspond with any movement of any identified significant items. For example, if a user moves into an area that has been identified for blurring, the video conference touch blur system 130 recognizes this movement and returns this transmission of this area to a higher resolution.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Also for example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A method for performing a video conference touch blur operation comprising:
    enabling actuation of a portion of a video conference screen image, the video conference screen image corresponding to an image to be transmitted to a video conference recipient;
    blurring a blur area of the video conference screen image in response to the actuation of the portion of the video conference screen image, the blur area being transmitted in a lower resolution than a higher resolution portion of the video conference screen image.

2. The method of claim 1 further comprising:
    identifying a significant item within the video conference screen image;
    tracking the significant item; and,
    adjusting the blur area to compensate as the significant item moves within the video image.

3. The method of claim 2 wherein:
    the identifying further comprises performing a facial recognition operation on the video conference screen image; and,
    the significant item comprises an image of a face of a user.

4. The method of claim 2 wherein:
    when a significant item is identified, allowing a user to select a blur all or no blur option if the significant item disappears from the video conference screen image.

5. An information handling system comprising:
    a processor;
    memory coupled to the processor, the memory storing a video conference touch blur system for performing a video conference touch blur operation, the video conference touch blur system comprising instructions executable by the processor for:
        enabling actuation of a portion of a video conference screen image, the video conference screen image corresponding to an image to be transmitted to a video conference recipient;
        blurring a blur area of the video conference screen image in response to the actuation of the portion of the video conference screen image, the blur area being transmitted in a lower resolution than a higher resolution portion of the video conference screen image.

6. The information handling system of claim 5 wherein the video conference touch blur system further comprises instructions for:
    identifying a significant item within the video conference screen image;
    tracking the significant item; and,
    adjusting the blur area to compensate as the significant item moves within the video image.

7. The information handling system of claim 6 wherein:
    the identifying further comprises performing a facial recognition operation on the video conference screen image; and,
    the significant item comprises an image of a face of a user.

8. The method of claim 6 wherein:
    when a significant item is identified, allowing a user to select a blur all or no blur option if the significant item disappears from the video conference screen image.

9. A non-transitory computer readable media, the computer readable media storing instructions executable by the processor for: comprising:

enabling actuation of a portion of a video conference screen image, the video conference screen image corresponding to an image to be transmitted to a video conference recipient;

blurring a blur area of the video conference screen image in response to the actuation of the portion of the video conference screen image, the blur area being transmitted in a lower resolution than a higher resolution portion of the video conference screen image.

10. The non-transitory computer readable media of claim 9, the computer readable media further storing instructions for:

identifying a significant item within the video conference screen image;

tracking the significant item; and, adjusting the blur area to compensate if the significant item moves into the blur area.

11. The non-transitory computer readable media of claim 10 wherein:

the identifying further comprises performing a facial recognition operation on the video conference screen image; and, the significant item comprises an image of a face of a user.

12. The non-transitory computer readable media of claim 10 wherein:

when a significant item is identified, allowing a user to select a blur all or no blur option if the significant item disappears from the video conference screen image.

* * * * *